Oct. 27, 1925.  
H. P. KRAFT  
1,558,680  
VALVE CONTROLLED NOZZLE  
Filed Feb. 16, 1922

INVENTOR:  
Henry Phillip Kraft,  
By Attorneys,

Patented Oct. 27, 1925.  1,558,680

UNITED STATES PATENT OFFICE.

HENRY PHILLIP KRAFT, OF RIDGEWOOD, NEW JERSEY; EDGAR J. PHILLIPS AND EARL A. DARR EXECUTORS OF THE WILL OF HENRY P. KRAFT, DECEASED.

VALVE-CONTROLLED NOZZLE.

Application filed February 16, 1922. Serial No. 537,078.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Valve-Controlled Nozzles, of which the following is a specification.

The present invention relates to a device adapted to direct a stream of fluid under pressure to a given place and to means for readily controlling the flow of the fluid through the device.

In the manufacture of pneumatic tire tubes, considerable difficulty is experienced in removing the tubes after vulcanization from the mandrels on which they are formed, owing to the tendency of the rubber to adhere to the mandrel. To overcome this it has been proposed to inject or direct a stream of fluid, preferably air, between the tube and the mandrel after the vulcanizing operation, to loosen the tube prior to removing it.

According to the present invention, I provide a convenient and practicable device by means of which a stream of fluid may be employed as proposed, or for any other desired purpose. The device is designed for manipulation by one hand and the flow of the fluid therethrough controlled by said hand without relinquishing its hold on the device. The invention in its preferred embodiment consists of a coupling having a check valve therein normally closed by the fluid pressure from a supply tank acting thereon, and a member associated with the coupling having a passage therethrough, the flow of fluid through said member being controlled by means on said member for unseating the check valve. The invention also includes other features of improvement which will be hereinafter more fuly set forth.

Referring to the drawings.

Figure 2:
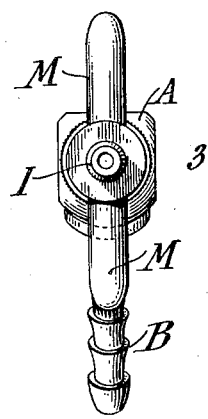
Fig. 2 is a side elevation.
Figure 1:
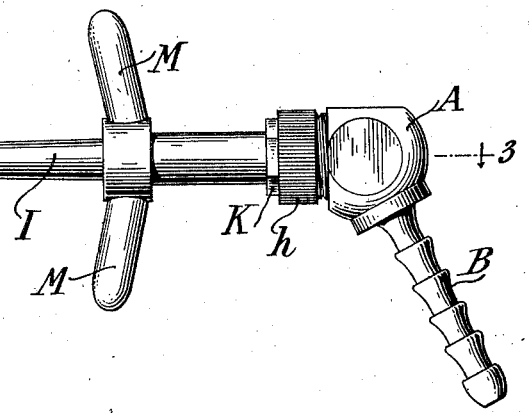
Figure 1 is a front elevation of the device.
Figure 3:
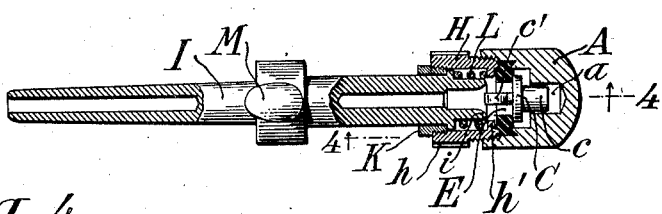
Fig. 3 is a longitudinal section taken substantially on the line 3—3 of Fig. 1 part of the device being shown in plan view.
Figure 4:
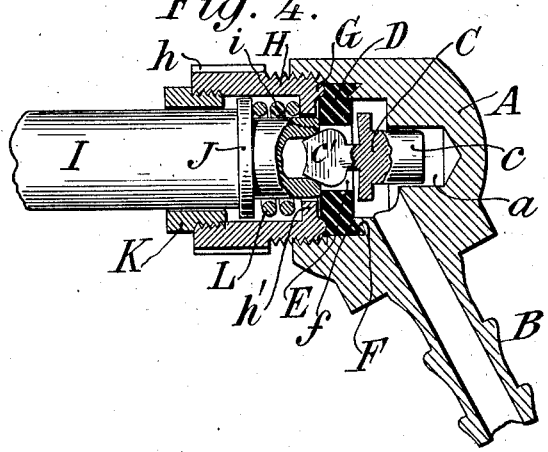
Fig. 4 is an enlarged sectional view taken on the line 4—4 of Fig. 3 and showing the check valve unseated.

In the drawings, let A indicate the body or casing of the coupling which is provided with the usual ridged shank B adapted to be engaged by a hose connecting with the source of fluid under pressure, such as a compressed air tank. Within the casing is located a check valve C which seats upon a flexible gasket D to close the passage E therethrough. The valve C is normally closed owing to the pressure from the reservoir acting upon it. The gasket D, which is preferably in the form of a flat rubber disk is confined between a shoulder F on the interior of the casing and the beaded head G on a sleeve H threaded into the casing. The sleeve H is preferably provided with a milled or other head $h$ to facilitate the screwing thereof into the casing. A leak-tight joint is provided between the gasket and the casing by confining the outer margin of the gasket between a sharp projecting edge $f$ on the shoulder F and the beaded head G. The check valve C has a guiding stem $c$ on one side thereof which works in a recess $a$ in the casing and on its opposite side it is provided with a projection $c'$ which enters freely through the opening in the gasket. This projection is preferably flattened as shown in Fig. 3 to afford free passage of air past it. The sides of the projection $c'$ are tapered so as to afford ready engagement with a suitable member for unseating the valve. The construction thus far described is substantially that of the inflating coupling set forth in my Patent No. 1,370,128.

According to the present invention I employ such inflating coupling with but slight modification as an element of a novel device for controlling and directing the flow of fluid under pressure.

In this novel device, there is coupled to the coupling casing A, a member I having a passage therethrough. This member is preferably formed as a nozzle, herein shown as slightly tapered toward its free end, but it will be understood that said member may have any desired form or configuration depending upon the use for which it is designed. The union between the member I and the casing A is preferably one which permits the former to move relatively longitudinally to the latter, to unseat the check valve and also wherein the end of member I is normally held in spaced relation from the valve projection $c'$ and the gasket D. This I accomplish by providing the member I with a flange J adjacent its end, adapted to abut against the end of a plug K seated in the end of sleeve H which limits the outward movement of the member. The plug K is hollow and also serves to guide the member I in its longitudinal movement. The member I is urged to its outward position by a coil spring L which encircles the end of the member and acts against the flange J at one end and against an inturned flange h' on the sleeve H at the other end.

When the member I is in its normal position, the check valve C remains seated and no fluid can pass through the member. To permit passage of fluid through the member the check valve is unseated by moving the member inwardly against the action of spring L. Simultaneously with the unseating of the valve, the end i of the member I makes contact with the gasket D to provide a leak-tight joint between the casing and the member. Any suitable means may be employed for moving the member I inwardly to unseat the valve, but in order that the device may be conveniently operated with one hand, I provide the member I at a suitable distance from its inner end with a pair of diametrically opposed grip projections or wings M adapted to be engaged by the fingers of the operator while holding the casing in the palm of the hand. It is preferable that the fingers engage over both wings when drawing the member inwardly so that a uniform seating will be provided between the end i of the member and the gasket D. A release of the finger grip of the wings M will cause the member I to return to normal position and the valve to again seat.

While I have shown and described a single embodiment of the invention it will be understood that the specific construction herein disclosed may be varied without departing from the spirit of the invention.

What I claim is:

1. In a device of the type described, a casing having a valve gasket, a check valve adapted to normally seat against said gasket, a member having a passage therethrough carried by said casing and adapted to simultaneously unseat the check valve and contact with the gasket to form a leak-tight seal with the casing.

2. In a device of the type described, a casing having a valve gasket therein, a check valve adapted to normally seat against said gasket, and a nozzle carried by and longitudinally slidable relatively to the casing adapted upon being moved inwardly to simultaneously unseat the check valve and contact with the gasket to form a seal with the casing.

3. In a device of the type described, a casing having a valve gasket, a sleeve holding said gasket therein, a check valve adapted to normally seat against said gasket, a member slidable within the sleeve and adapted to unseat the check valve and means normally holding said member out of contact with the check valve and limiting its outward movement.

In witness whereof, I have hereunto signed my name.

HENRY PHILLIP KRAFT.